US009604853B2

(12) United States Patent
Ikari et al.

(10) Patent No.: US 9,604,853 B2
(45) Date of Patent: Mar. 28, 2017

(54) LIGHT TRANSMITTING METAL OXIDE SINTERED BODY MANUFACTURING METHOD AND LIGHT TRANSMITTING METAL OXIDE SINTERED BODY

(71) Applicant: Shin-Etsu Chemical Co., Ltd., Tokyo (JP)

(72) Inventors: Masanori Ikari, Annaka (JP); Tadakatsu Shimada, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/766,196

(22) PCT Filed: Dec. 19, 2013

(86) PCT No.: PCT/JP2013/084064
§ 371 (c)(1),
(2) Date: Aug. 6, 2015

(87) PCT Pub. No.: WO2014/122865
PCT Pub. Date: Aug. 14, 2014

(65) Prior Publication Data
US 2015/0376023 A1 Dec. 31, 2015

(30) Foreign Application Priority Data
Feb. 8, 2013 (JP) .................. 2013-023029

(51) Int. Cl.
C04B 35/645 (2006.01)
C01F 17/00 (2006.01)
(Continued)

(52) U.S. Cl.
CPC .......... *C01F 17/0043* (2013.01); *C04B 35/50* (2013.01); *C04B 35/505* (2013.01);
(Continued)

(58) Field of Classification Search
CPC ............... C04B 35/6455; C04B 35/115; C04B 2235/6562; C04B 2235/9653
See application file for complete search history.

(56) References Cited

U.S. PATENT DOCUMENTS 4,758,541 A 7/1988 Tsukuma
5,013,696 A 5/1991 Greskovich et al.
(Continued)

FOREIGN PATENT DOCUMENTS

JP 60-231469 A 11/1985
JP 62-91467 A 4/1987
(Continued)

OTHER PUBLICATIONS

JP 2011-134958 A (Miyoshi) Jul. 7, 2011 (English language machine translation). [online] [retrieved May 10, 2016]. Retrieved from: Espacenet.*
(Continued)

Primary Examiner — Erin Snelting
(74) Attorney, Agent, or Firm — Westerman, Hattori, Daniels & Adrian, LLP

(57) ABSTRACT

Provided is a light transmitting metal oxide sintered body manufacturing method for obtaining a light transmitting sintered body, the main component of which is metal oxide, by carrying out hot isostatic pressing at a HIP heat processing temperature (T) set in a temperature range of 1000-2000° C. The light transmitting metal oxide sintered body manufacturing method, by which light transmitting properties can be improved, is characterized by the following: in the temperature elevating step of the hot isostatic pressing, a temperature range (S) from room temperature to the HIP heat processing temperature (T) is divided into a plurality of stages; for each divided stage the temperature elevation rate is controlled; and the temperature elevation rate of a final
(Continued)

stage (14) that includes at least the HIP heat processing temperature (T) is 10° C./h to 180° C./h.

8 Claims, 1 Drawing Sheet

(51) Int. Cl.
*C04B 35/50* (2006.01)
*C04B 35/505* (2006.01)

(52) U.S. Cl.
CPC ...... *C04B 35/6455* (2013.01); *C01P 2006/60* (2013.01); *C04B 2235/3206* (2013.01); *C04B 2235/3217* (2013.01); *C04B 2235/3224* (2013.01); *C04B 2235/3225* (2013.01); *C04B 2235/3232* (2013.01); *C04B 2235/3244* (2013.01); *C04B 2235/3286* (2013.01); *C04B 2235/3287* (2013.01); *C04B 2235/3296* (2013.01); *C04B 2235/3298* (2013.01); *C04B 2235/3418* (2013.01); *C04B 2235/5436* (2013.01); *C04B 2235/6562* (2013.01); *C04B 2235/661* (2013.01); *C04B 2235/786* (2013.01); *C04B 2235/9653* (2013.01)

(56) References Cited

U.S. PATENT DOCUMENTS

| 7,253,129 | B2 | 8/2007 | Takagimi et al. |
| 8,541,330 | B2 | 9/2013 | Menke et al. |
| 2008/0164626 | A1* | 7/2008 | Zimmer ............... B82Y 30/00 264/1.21 |

FOREIGN PATENT DOCUMENTS

| JP | 62-105955 A | 5/1987 |
| JP | 63-30374 A | 2/1988 |
| JP | 2-2824 A | 1/1990 |
| JP | 2-25864 A | 1/1990 |
| JP | 3-275560 A | 12/1991 |
| JP | 3-275561 A | 12/1991 |
| JP | 6-211573 A | 8/1994 |
| JP | 2638669 B2 | 8/1997 |
| JP | 2008-1556 A | 1/2008 |
| JP | 2008-143726 A | 6/2008 |
| JP | 4237707 B2 | 3/2009 |
| JP | 2009-256762 A | 11/2009 |
| JP | 2010-241678 A | 10/2010 |
| JP | 2011-134958 A | 7/2011 |

OTHER PUBLICATIONS

JP S 63-30374 A (Kakizaki) Feb. 9, 1998 (English lanugage machine translation). [online] [retrieved Jul. 5, 2016]. Retrieved from: Espacenet.*
International Search Report dated Jan. 28, 2014, issued in counterpart application No. PCT/JP084064 (2 pages).

* cited by examiner

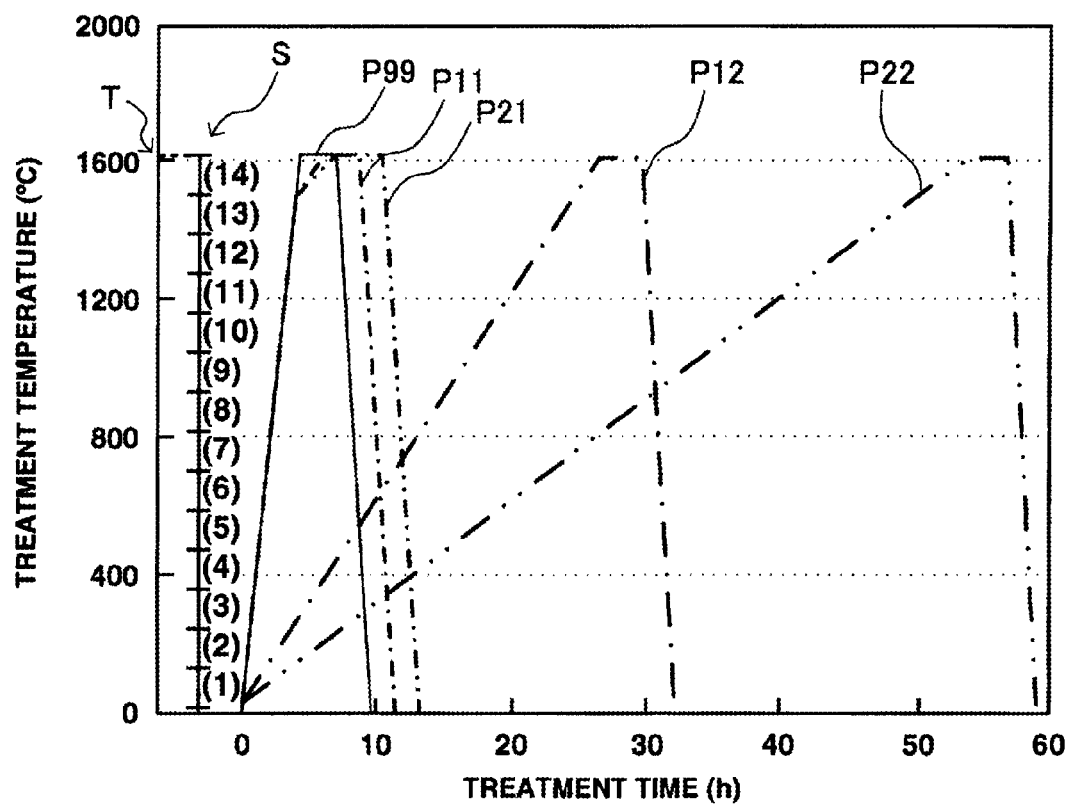

LIGHT TRANSMITTING METAL OXIDE SINTERED BODY MANUFACTURING METHOD AND LIGHT TRANSMITTING METAL OXIDE SINTERED BODY

TECHNICAL FIELD

This invention relates to a method for manufacturing a metal oxide sintered body, especially a light-transmissive metal oxide sintered body which is light transmissive in the visible and/or infrared region, and a metal oxide sintered body manufactured by the method. More particularly, it relates to a method for manufacturing a metal oxide sintered body which is used in optical applications as solid-state laser media, EB scintillator materials, magneto-optical device materials, light-emitting tubes, optical refractive index window materials, optical shutters, optical recording media, and light-transmissive bulletproof materials.

BACKGROUND ART

While there are numerous metal oxide sintered bodies, some are known to be more consolidated as they are more light transmissive. In particular, those sintered bodies having undergone hot isostatic pressing (HIP) step in the sintered body manufacturing process are confirmed to develop outstanding light transmittance. Since light-transmissive metal oxide sintered bodies are recently used in a variety of optical applications, active efforts are widely made on their development.

For example, JP-B H02-002824 (Patent Document 1) discloses a method comprising the steps of firing a ceramic compact (PLZT) composed mainly of lead, lanthanum, zirconium, and titanium oxides in vacuum to a density which is at least 97% of the theory density, burying the sintered body in a heat-resistant container which is closely packed with a powder of at least one type selected from fused aluminum oxide, fused zirconium oxide, and fused magnesium oxide, the powder having a particle size of 50 to 3,000 µm, and effecting HIP treatment. By this method, allegedly, ceramics having very high transparency and denseness for optical devices are consistently manufactured in a mass scale.

Also, JP-B H02-025864 (Patent Document 2) discloses a method for manufacturing a light-transmissive zirconia sintered body comprising the steps of firing a shaped body composed of at least 2 mol % of $Y_2O_3$, 3 to 20 mol % of $TiO_2$, and $ZrO_2$ in an oxygen-containing atmosphere, HIP treatment, and oxidative treatment. By this method, allegedly, light-transmissive zirconia sintered bodies having improved light transmission and high refractive index are manufactured.

Further, JP-A H03-275560 (Patent Document 3) discloses a method for manufacturing a light-transmissive yttrium-aluminum-garnet sintered body having a linear transmittance of at least 75% of infrared light of wavelength 3 to 4 µm at a thickness of 3 mm, comprising the steps of compacting powder, sintering to a high density, and HIP treatment at 1,500 to 1,800° C. and 500 kg/cm² or higher; and JP-A H03-275561 (Patent Document 4) discloses a method for manufacturing a light-transmissive YAG sintered body comprising the steps of hot pressing a YAG powder having a purity of at least 99.6% and a specific surface area (BET value) of at least 4 m²/g at a temperature of 1,300 to 1,700° C. and a pressure of 100 to 500 kg/cm² in vacuum for consolidation to a density of at least 95% of the theory, then HIP treatment at a temperature of 1,400 to 1,800° C. and a pressure of at least 500 kg/cm². By these methods, allegedly, YAG sintered bodies having improved light transmission and high density are manufactured.

Furthermore, JP 2638669 (Patent Document 5) discloses a method for manufacturing a ceramic body comprising the steps of forming a green compact of appropriate shape and composition, pre-sintering the compact at a temperature range of 1,350 to 1,650° C., HIP treatment at a temperature of 1,350 to 1,700° C., and re-sintering at a temperature beyond 1,650° C. By this method, allegedly, highly transparent polycrystalline ceramic bodies are manufactured.

Besides, JP-A H06-211573 (Patent Document 6) discloses a method for manufacturing a transparent $Y_2O_3$ sintered body comprising the steps of sintering a $Y_2O_3$ powder having a purity of at least 99.8% and a primary particle average size of 0.01 to 1 µm, to a density of at least 94% of the theory, then subjecting the sintered body to HIP treatment at a temperature range of 1,600 to 2,200° C. and a gas pressure of at least 100 kg/cm². By this method, allegedly, there are manufactured pure $Y_2O_3$ sintered bodies of the system that does not contain radioactive $ThO_2$ as sintering aid or does not contain LiF and BeO.

Besides, JP 4237707 (Patent Document 7) discloses a rare earth garnet sintered body obtained via HIP and annealing in a pressurized oxygen atmosphere, having an average crystallite size of 0.9 to 9 µm, a light loss factor of up to 0.002 $cm^{-1}$ at measurement wavelength 1.06 µm, and a transmitted wavefront strain of up to 0.05 $\lambda cm^{-1}$ at measurement wavelength 633 nm. Allegedly, there is obtained a garnet sintered body which is uncolored, reduced in light loss, and prevented from pore formation, and has a light loss factor of up to 0.002 $cm^{-1}$ at measurement wavelength 1.06 µm.

Further, JP-A 2008-001556 (Patent Document 8) discloses a method for preparing a light-transmissive rare earth gallium garnet sintered body, comprising the steps of compacting a high purity rare earth oxide powder of purity at least 99.9% containing 5 ppm by weight—less than 1000 ppm by weight, calculated as metal, of at least one element selected from the group consisting of Ge, Sn, Sr and Ba as sintering aid, with a binder, into a compact having a density of at least 58% of the theoretical density, heat treating the compact to burn out the binder, firing the compact in an atmosphere of hydrogen gas, argon gas or a mixture thereof, or in vacuum, at 1,400 to 1,650° C. for at least 0.5 hour, and thereafter, effecting HIP treatment at a temperature of 1,000 to 1,650° C. and a pressure of 49 to 196 MPa. Allegedly, this method facilitates consolidation and improves light transmittance.

Furthermore, JP-A 2008-143726 (Patent Document 9) discloses a method for preparing a polycrystalline transparent $Y_2O_3$ ceramic for electron beam fluorescence in the form of a polycrystalline sintered body composed mainly of $Y_2O_3$, the polycrystalline sintered body having a porosity of up to 0.1% and an average crystal grain size of 5 to 300 µm, and containing a lanthanide element, the method comprising the steps of primarily firing a compact containing a $Y_2O_3$ powder and a lanthanide oxide powder in an oxygen atmosphere at 1,500 to 1,800° C. to form a primary fired body, and secondarily firing the primary fired body at a temperature of 1,600 to 1,800° C. and a pressure of 49 to 198 MPa. Allegedly, there is produced a polycrystalline transparent $Y_2O_3$ ceramic for electron beam fluorescence, having a mass scale productivity, containing a high concentration of fluorescent element (lanthanide element), and having the fluorescent element uniformly dispersed in the overall range of polycrystalline transparent $Y_2O_3$ ceramic.

Recently, JP-A 2010-241678 (Patent Document 10) discloses a method for preparing an optical ceramic material of the formula: $A_{2+x}B_yD_zE_7$ wherein $-1.15 \leq x \leq 1.1$, $0 \leq y \leq 3$, $0 \leq z \leq 1.6$, $3x+4y+5z=8$, A is at least one trivalent cation selected from rare earth ions, B is at least one tetravalent cation, D is at least one pentavalent cation, and E is at least one divalent anion, the method comprising the steps of forming a compact from a powder mixture of starting materials containing at least one sintering aid selected from the group consisting of $SiO_2$, $TiO_2$, $ZrO_2$, $HfO_2$, $Al_2O_3$ and fluorides, pre-sintering the compact at a temperature of preferably 500 to 900° C., and sintering the pre-sintered compact at a temperature of 1,400 to 1,900° C., and compressing the sintered compact in vacuum, preferably at a temperature of 1,400 to 2,000° C. and preferably a pressure of 10 to 198 MPa (HIP treatment). Allegedly, an optical ceramic material having optical properties equivalent to single crystal is produced.

As described above, active efforts are recently made on the development of oxide sintered bodies having light transmission, especially the development of oxide sintered bodies via HIP treatment step. In particular, a variety of studies are carried out to improve the light transmission of sintered bodies.

CITATION LIST

Patent Documents

Patent Document 1: JP-B H02-002824
Patent Document 2: JP-B H02-025864
Patent Document 3: JP-A H03-275560
Patent Document 4: JP-A H03-275561
Patent Document 5: JP 2638669
Patent Document 6: JP-A H06-211573
Patent Document 7: JP 4237707
Patent Document 8: JP-A 2008-001556
Patent Document 9: JP-A 2008-143726
Patent Document 10: JP-A 2010-241678

SUMMARY OF INVENTION

Technical Problem

An object of the invention, which has been made under the above-mentioned circumstances, is to provide a method for manufacturing a light-transmissive metal oxide sintered body, the method being capable of improving light transmission, and a light-transmissive metal oxide sintered body.

Solution to Problem

There are known many examples of the development of light-transmissive oxide sintered bodies including HIP step. A precise study on the conditions of these HIP steps reveals that only atmosphere gas, temperature, pressure and holding time are prescribed in most examples while the temperature ramp rate of HIP step is prescribed in few examples. Although some examples refer to the ramp rate of HIP step, the ramp rate is very high in all of them. There are found no examples attempting to slow down the ramp rate. For example, the specification of JP 2638669 (Patent Document 5) describes HIP step involving heating at a ramp rate of about 10 to 50° C. per minute (i.e., 600 to 3,000° C./h), and holding at a temperature of 1,350 to 1,700° C. in argon gas under a pressure of 5,000 to 25,000 psi for ½ to 2 hours. Also, the specification of JP-A H06-211573 (Patent Document 6) describes HIP treatment step involving heating at a rate of 200° C./h to a selected temperature of 1,800 to 2,050° C., holding at the temperature under a pressure of 150 to 2,000 kg/cm² for 2 to 3 hours, and cooling at a rate of 200° C./h. Further the specification of JP 4237707 (Patent Document 7) describes HIP step of holding in Ar atmosphere at 1,350 to 1,850° C. and 10 to 250 MPa for 1 to 100 hours, and refers to an exemplary ramp rate of 500° C./h. Further, JP-A 2008-001556 (Patent Document 8) describes, in Examples, HIP treatment conditions including pressure medium Ar, concurrent temperature/pressure elevation mode, ramp rate 800° C./h, treatment temperature 1,000 to 1,650° C., pressure 49 to 196 MPa, and treatment time 3 hours.

Making investigation on the typical process of preparing a light-transmissive oxide sintered body, surprisingly the inventors have found that by adjusting the temperature ramp rate of the HIP step so as to fall in a low (slow) range that is not described in the patent documents, specifically for the first time, below 60° C./h, light transmission is dramatically improved, as compared with the oxide sintered body subjected to the conventional high ramp rate HIP step (the conventional HIP treatment involves a very high ramp rate of 200 to 800° C./h as discussed above). Continuing extensive investigations based on this finding, the inventors have completed the invention.

The invention provides a method for manufacturing a light-transmissive metal oxide sintered body, and a light-transmissive metal oxide sintered body, as defined below.

[1] A method for manufacturing a light-transmissive metal oxide sintered body by subjecting a sintered body composed mainly of metal oxide to hot isostatic pressing (HIP) treatment at a HIP heat treatment temperature T set in a range of 1,000 to 2,000° C. to form a light-transmissive sintered body, characterized in that the HIP treatment includes the step of heating at a ramp rate over a temperature range from room temperature to the HIP heat treatment temperature T, the temperature range is divided into a plurality of stages, the ramp rate is controlled in each divided stage, and the ramp rate of at least a final stage inclusive of the HIP heat treatment temperature T is 10° C./h to 180° C./h.

[2] The method of [1] wherein the temperature range of the heating step is equally divided into 2 to 20 stages.

[3] The method of [1] or [2] wherein in the heating step of the HIP treatment, the final stage is conducted at a ramp rate of 10° C./h to 180° C./h and the remaining stages are conducted at a ramp rate of 200° C./h to 800° C./h.

[4] The method of [1] or [2] wherein in the heating step of the HIP treatment, all stages are conducted at a ramp rate of 10° C./h to 180° C./h.

[5] The method of any one of [1] to [4] wherein the sintered body is prepared using the particulate oxide of at least one metal element selected from the group consisting of Mg, Y, Sc, lanthanides, Ti, Zr, Al, Ga, Si, Ge, Pb, and Bi.

[6] The method of [5], comprising press molding the metal oxide particles into a body of predetermined shape, sintering the body, and subjecting the sintered body to the HIP treatment.

[7] A light-transmissive metal oxide sintered body manufactured by the method of any one of [1] to [6].

Advantageous Effects of Invention

The invention is successful in manufacturing a light-transmissive metal oxide sintered body which is significantly improved in light transmission over the optical properties of metal oxide sintered bodies manufactured by prior art methods.

BRIEF DESCRIPTION OF DRAWINGS

FIGURE is a diagram showing the temperature profile of HIP treatment step in the method for manufacturing a light-transmissive metal oxide sintered body according to the invention.

DESCRIPTION OF EMBODIMENTS

The method for manufacturing a light-transmissive metal oxide sintered body according to the invention is described below.

The method for manufacturing a light-transmissive metal oxide sintered body according to the invention by subjecting a sintered body composed mainly of metal oxide to hot isostatic pressing (HIP) treatment at a HIP heat treatment temperature T set in a range of 1,000 to 2,000° C. to form a light-transmissive sintered body, is characterized in that the HIP treatment includes the step of heating at a ramp rate over a temperature range from room temperature to the HIP heat treatment temperature T, the temperature range is divided into a plurality of stages, the ramp rate is controlled in each divided stage, and the ramp rate of at least a final stage inclusive of the HIP heat treatment temperature T is 10° C./h to 180° C./h. The detail is described below.

[Manufacture Method]

The method of the invention preferably involves furnishing a preselected metal oxide in particle form as raw material powder (or starting material), press molding the powder into a predetermined shape, burnout and sintering into a sintered body consolidated to a relative density of at least 95% by weight. The sintered body is then subjected to hot isostatic pressing (HIP) treatment. Thereafter, post-treatment such as annealing may be optionally carried out.

(Raw Material Powder)

As the raw material powder, any particulate metal oxides which exhibit light transmission when sintered may be utilized. That is, particles of one or more type selected from metal oxides which exhibit light transmission when sintered may be utilized as the raw material powder. For example, particles of YSZ (yttria-stabilized zirconia), spinel ($Al_2O_3$-26 wt % MgO), PLZT (lead lanthanum zirconate titanate), alumina, YAG ($Y_3Al_5O_{12}$), LuAG ($Lu_3Al_5O_{12}$), TGG ($Tb_3Ga_5O_{12}$), sesquioxides, BGO ($Bi_4Ge_3O_{12}$), and GSO ($Gd_2SiO_5$) are preferred as well as particles of oxides of constituent elements of metal oxides which are generally confirmed or expected to have light transmission, for example, particles of oxides of one or more metal elements selected from the group consisting of Mg, Y, Sc, lanthanides, Ti, Zr, Al, Ga, Si, Ge, Pb, and Bi.

Any of these particulate metal oxides are weighed so as to meet an appropriate ratio and used as the raw material powder.

When it is desired to manufacture a $M_2O_3$ type sesquioxide sintered body wherein M is one or more rare earth elements selected from the group consisting of Y, Sc, and lanthanide series elements, use may be made of particulate oxides of one or more rare earth elements selected from the group consisting of Y, Sc, and lanthanide series elements, specifically a powder consisting of particulate oxides of one or more rare earth elements selected from the group consisting of Y, Sc, Lu, Tb, Yb, Gd, Nd, Eu, Ho, Dy, Tm, Sm, Pr, Ce, and Er and particulate Zr oxide. The amount of $ZrO_2$ powder added is preferably up to 1% by weight (exclusive of 0% by weight), more preferably up to 0.5% by weight. If $ZrO_2$ powder is not at all added, bubble coalescence is promoted in the sintering step so that bubble growth may take place to form coarse bubbles of micron size, detracting from light transmission. If more than 1% by weight of $ZrO_2$ powder is added, undesirably part of $ZrO_2$ may segregate in the $M_2O_3$ type sesquioxide sintered body as a second phase during the sintering step, detracting from light transmission.

The aforementioned particulate metal oxides preferably have a purity of at least 99.9% by weight. Their particle shape is not particularly limited, and particles of angular, spherical or plate shape, for example, are advantageously used. Even a powder having undergone secondary agglomeration may be advantageously used, and a granular powder granulated by atomization treatment such as spray drying may also be advantageously used. The process of preparing the raw material powder is not particularly limited, and a raw material powder prepared by co-precipitation, pulverization, spray pyrolysis, or any other synthesis techniques may be advantageously used. If desired, the raw material powder thus prepared may be treated in a wet ball mill, bead mill, jet mill, dry jet mill, hammer mill or the like.

In the practice of the invention, the raw material powder of metal oxide particles preferably has such a particle size distribution (or particle size distribution of secondary particles if particles agglomerate into secondary particles) that a particle diameter ($D_{2.5}$) corresponding to an accumulation of 2.5% from the minimum side may fall in a range of 180 nm to 2,000 nm. If $D_{2.5}$ value is less than 180 nm, bubbles may coalesce and grow in the sintering step into coarse bubbles of micron size, detracting from light transmission. If $D_{2.5}$ value exceeds 2,000 nm, there is a possibility that voids formed between particles during molding become too large, which cooperates with the constituent particles of already sufficiently enlarged size, so that the free energy on the particle surface is reduced. This prevents effective progress of sintering and makes it difficult to produce a dense light-transmissive sintered body.

Although the measurement of particle size is not particularly limited, reference is preferably made to the value obtained by dispersing the raw material particles in a liquid medium and measuring a diameter by the light scattering or light diffraction method, because the particle size distribution can also be evaluated.

To the raw material powder used herein, a sintering inhibitor may be added if desired. For a particularly high light transmission, it is preferred to add a sintering inhibitor compatible with each light-transmissive metal oxide. The inhibitor should preferably have a purity of at least 99.9% by weight. Where the sintering inhibitor is not added, it is recommended to choose the raw material powder whose primary particles are of nano size and have very high sintering activity. Such a choice is optional.

Further, for the purpose of improving the quality stability and yield in the manufacture process, various organic additives are preferably added. In the practice of the invention, no particular limits are imposed on these additives, and various dispersants, binders, lubricants, plasticizers and the like may be advantageously utilized.

To the raw material powder used herein, an optical function activator may be added, if desired, so as to comply with the desired optical application. For example, there may be added a laser material capable of creating a population inversion state for laser oscillation at the desired wavelength, a scintillator material capable of fluorescence upon receipt of ionization radiation at high sensitivity, or a supersaturation absorber capable of imparting supersaturation absorption function for pulse laser oscillation, such as neodymium, praseodymium, chromium or the like. In the practice of the invention, these activators may be added if desired. The activator, if added, should preferably have a purity of at least 99.9% by weight.

(Press Molding)

In the manufacture method of the invention, a conventional press molding step is advantageously used. That is, a quite common pressing step of filling a mold with powder and applying pressure in a certain direction, or a cold isostatic press (CIP) step of closely packing a waterproof deformable container with powder and applying hydrostatic pressure may be utilized. Notably, the applied pressure may be adjusted as appropriate while monitoring the relative density of the molded body. Though not critical, it is recommended to manage the pressure in a range of 300 MPa or less that can be handled by a commercially available CIP system, because the manufacture cost is reduced. Alternatively, a hot press step capable of achieving molding and sintering straight through the molding step, discharge plasma sintering step, microwave heating step or the like may also be advantageously utilized.

(Binder Burnout)

In the manufacture method of the invention, a conventional binder burnout step may be advantageously utilized. That is, the method may involve the step of burning out the binder by heating in a heating furnace. The type of the atmosphere gas is not particularly limited, and air, oxygen, hydrogen or the like may be used. Although the burnout temperature is not particularly limited, where an organic component such as binder is added, heating up to the temperature at which the organic component is decomposed off is preferred.

(Sintering)

In the manufacture method of the invention, a general sintering step may be advantageously utilized. That is, a heating/sintering step of resistance heating or induction heating mode may be advantageously utilized. The type of the atmosphere gas is not particularly limited, and an inert gas, oxygen, hydrogen or the like may be used, or even vacuum is acceptable.

In the sintering step, the sintering temperature is adjusted as appropriate depending on the preselected starting material. In general, a temperature which is lower by several tens of degrees of centigrade to 100° C. or 200° C. than the melting point of a sintered body to be prepared from the preselected starting material is preferably selected. It is preferred to select the temperature which is as high as possible within the range so that the material may be consolidated to a relative density of at least 95% by weight. When it is intended to produce a metal oxide sintered body in which a temperature zone inducing a phase change to a phase other than the cubic crystal system is present in proximity to the selected temperature, sintering at the temperature which is strictly managed to be lower than that temperature gives the advantage that optical strain or cracking is unlikely to occur in the material because a phase shift from non-cubic to the cubic crystal system does not substantially take place.

The sinter holding time is adjusted as appropriate depending on the preselected starting material. While several hours of holding is generally satisfactory in many cases, it is recommended to ensure a time until the metal oxide sintered body is consolidated to a relative density of at least 95% by weight.

(Hot Isostatic Pressing (HIP))

In the manufacture method of the invention, the sintering step should be followed by the hot isostatic pressing (HIP) treatment step. The HIP apparatus used in this step may be of general construction. The HIP treatment is carried out by placing the sintered body having completed treatments until the sintering step in a pressure vessel, applying a uniform pressure across the entire sintered body by means of a pressurizing gas medium, and concurrently heating the sintered body at the predetermined HIP heat treatment temperature T by means of an electric resistance heating unit mounted within the pressure vessel. The HIP apparatus includes a crucible (carbon vessel) with a perforated carbon lid in which the sintered body is received, and a HIP furnace in which the carbon vessel is placed, the HIP furnace having heating means in the form of a carbon heater, wherein the sintered body is heated by the carbon heater while it is entirely compressed by introducing a pressurizing gas medium into the HIP furnace.

The pressurizing gas medium used herein may be an inert gas such as argon or Ar—$O_2$. It is convenient and preferable that the applied pressure is equal to or less than 196 MPa which can be managed by a commercial HIP apparatus.

The HIP heat treatment temperature T may be set as appropriate, depending on the type of metal oxide of the sintered body and/or the sintered state of the sintered body, for example, in the range of 1,000 to 2,000° C., preferably 1,400 to 1,900° C. Like the sintering step, it is essential that the HIP temperature T be equal to or lower than the melting point and/or the phase transition point of metal oxide of the sintered body. If the HIP temperature T exceeds 2,000° C. and hence, exceeds the melting point and/or the phase transition point of metal oxide of the sintered body, it becomes difficult to perform adequate HIP treatment. If the HIP temperature T is lower than 1,000° C., an effect of improving the light transmission of the sintered body is not available.

In the disclosure, the temperature associated with the HIP treatment always refers to the temperature of the metal oxide sintered body. In the actual HIP apparatus wherein the metal oxide sintered body is received in the carbon vessel disposed inside the carbon heater in the HIP furnace, it is difficult to measure the temperature of the sintered body directly. Since the difference in temperature between the carbon heater and the carbon vessel during the heating and cooling steps is equal to or less than 10° C., and the temperature of the carbon vessel is substantially equal to the temperature of the metal oxide sintered body therein, it is acceptable to consider the measured temperature of the carbon heater in the HIP furnace to be the temperature of the metal oxide sintered body. Accordingly, once the temperature of the carbon heater in the HIP furnace is measured by a thermocouple (e.g., platinum-rhodium), the HIP apparatus controls the steps of heating and cooling the metal oxide sintered body on the basis of the measured temperature.

The manufacture method of the invention is characterized in that the HIP treatment includes the step of heating at a ramp rate over a temperature range, the temperature range of the heating step is divided into a plurality of stages, the ramp rate is controlled in each divided stage, and the ramp rate of at least a final stage inclusive of the HIP heat treatment temperature T is 10° C./h to 180° C./h, preferably 10° C./h to 150° C./h, more preferably 10° C./h to 60° C./h, and most preferably 20° C./h to 40° C./h. If the ramp rate exceeds 180° C./h, an effect of improving the light transmission of the sintered body is not available. A ramp rate of less than 10° C./h is unacceptable from the aspect of productivity because the HIP treatment takes a too long time. The temperature control in the heating step is preferably conducted by a proportional-integral-derivative (PID) controller on the basis of the measurement results.

In the HIP treatment, the pressure applied by the pressurizing gas medium is preferably 50 to 300 MPa, more preferably 100 to 300 MPa. At a pressure of less than 50 MPa, a light transmission improving effect may not be available. If the pressure is increased beyond 300 MPa, no further improvement in light transmission is available, and an excessive load may be imposed on the apparatus, causing damage to the apparatus.

FIGURE illustrates an exemplary temperature profile of metal oxide sintered body during HIP treatment step in the method for manufacturing a light-transmissive metal oxide sintered body according to the invention. The temperature profile illustrated herein includes heating, temperature holding, and cooling steps, provided that the HIP heat treatment temperature T is 1,625° C. The temperature profiles P11, P12, P21, and P22 belong to the invention whereas the temperature profile P99 belongs to the prior art.

Referring to the temperature profiles P11 as a typical example, it is described how to control the temperature during the HIP treatment according to the invention.

According to the invention, once the HIP heat treatment temperature T is set at 1,625° C., the temperature range S from room temperature to the HIP heat treatment temperature T in the heating step of the HIP treatment is divided into a plurality of stages. The mode of division may be determined from a balance of the efficiency of HIP treatment with the light transmission improving effect of sintered body. For example, the temperature range S may be equally divided into 2 to 20 stages. In FIGURE, the temperature range S from room temperature (25° C.) to 1,625° C. is equally divided into 14 stages.

Next, the ramp rate for each divided stage is set, and specifically, the ramp rate of at least a final stage inclusive of the HIP heat treatment temperature T is set in a range from 10° C./h to 180° C./h. As long as this requirement is met, the ramp rates of the remaining stages are set arbitrary. For example, with the productivity of HIP treatment taken into account, it is recommended that the ramp rate of the final stage of the heating step be set in a range from 10° C./h to 180° C./h and the ramp rates of the remaining stages be set in a range from 200° C./h to 800° C./h. The temperature profile P11 in FIGURE shows that the ramp rate of the final stage (14) of the heating step is 60° C./h and the ramp rates of the remaining stages (1) to (13) are 400° C./h, equal to the conventional temperature profile P99.

Next, the sintered body is held at the HIP heat treatment temperature T for a certain time (temperature holding step). The holding time is not particularly limited and may be set as appropriate for the selected material (type of metal oxide of the sintered body). The temperature profile P11 in FIGURE includes a holding time of 3 hours.

Next, the sintered body is cooled down to room temperature (cooling step). The temperature drop rate of the cooling step is not particularly limited, and the step may be either air cooling or spontaneous cooling. It is unnecessary to select an intentionally slow rate like the heating step. Notably, an excessive drop rate and/or an excessive pressure withdrawal is undesirable because an incidental impact is applied to the metal oxide sintered body being manufactured, becoming the cause of cracks. The temperature profile P11 in FIGURE includes a drop rate of 400° C./h, equal to the conventional temperature profile P99.

By carrying out HIP treatment according to the temperature profile P11 set as above, the sintered body is improved in light transmission.

With respect to the temperature profile of HIP heat treatment, since it suffices that the ramp rate of at least the final stage inclusive of the HIP heat treatment temperature T is in the range from 10° C./h to 180° C./h, for example, the ramp rates of all stages in the heating step of HIP treatment may be 10° C. to 180° C./h. The temperature profile P12 in FIGURE shows that the ramp rates of all stages (1) to (14) in the heating step are equal to 60° C./h while other steps (temperature holding and cooling steps) are the same as in temperature profile P11.

The temperature profile P21 in FIGURE shows that the ramp rates of stages (1) to (13) in the heating step are equal to 400° C./h and the ramp rate of the final stage (14) is 30° C./h while other steps (temperature holding and cooling steps) are the same as in temperature profile P11.

The temperature profile P22 in FIGURE shows that the ramp rates of all stages (1) to (14) in the heating step are equal to 30° C./h while other steps (temperature holding and cooling steps) are the same as in temperature profile P11.

In the conventional temperature profile P99, the ramp rates of all stages (1) to (14) in the heating step are equal to 400° C./h while other steps (temperature holding and cooling steps) are the same as in temperature profile P11.

(Optical Polishing)

In the manufacture method of the invention, once the metal oxide sintered body has passed the series of steps until the HIP treatment step, the sintered body is preferably subjected to optical polishing on its axially opposed end surfaces with respect to an optical axis of utilization. The optical surface is polished at an accuracy of up to $\lambda/8$, more preferably up to $\lambda/10$, provided that the measurement wavelength $\lambda$ is 633 nm. Notably, more precise optical measurement becomes possible when an antireflective coating is deposited on the optically polished surface.

By the method for manufacturing a light-transmissive metal oxide sintered body according to the invention, a metal oxide sintered body having very high light transmission is provided.

In the practice of the invention, if desired, the sintered body may be assembled into a device compliant with the intended optical application.

EXAMPLES

Examples and Comparative Examples are given below by way of illustration and not by way of limitation. The average particle size of powder is a weight average value determined by the laser light diffraction method. In the HIP apparatus, the temperature of the carbon heater inside the HIP furnace was measured by a platinum-rhodium thermocouple. The heating and cooling steps were controlled on the assumption that the measured temperature was the temperature of a metal oxide sintered body.

Example 1

An example using $Y_2O_3$ powder as the raw material powder is described.

There was furnished $Y_2O_3$ powder with a purity of at least 99.9 wt %, available from Shin-Etsu Chemical Co., Ltd., to which was added 0.5 wt % of $ZrO_2$ powder, available from Daiichi Kigenso Kagaku Kogyo Co., Ltd. Further an organic dispersant and organic binder were added to the powders, which were dispersed and mixed in ethanol in a zirconia ball mill. The milling time was 24 hours. Subsequent spray drying yielded a granular raw material (starting material) having an average particle size of 20 μm.

Next, a mold having a diameter of 10 mm was filled with the starting material. Using a uniaxial press molding machine, the material was preliminary molded into a rod of 20 mm long, which was hydrostatically pressed under a pressure of 198 MPa into a CIP compact. The CIP compact was placed in a muffle furnace where it was heat treated in air at 800° C. for 3 hours for binder burnout.

Further, the samples of Examples 1-1, 1-5, 1-7 and 1-9 and Comparative Example 1 on their optical surface were subjected to mirror etching treatment with hydrochloric acid at constant temperature until sintered grain boundary was definitely seen. The sample was observed under SEM and sintered grain size was measured. An average of 400 grains is reported as average sintered grain size.

The results are shown in Table 1.

TABLE 1

Sintered body type: $Y_2O_3$
HIP heat treatment temperature T = 1,500-1,800° C.

| | HIP heating pattern | | Transmittance*[1] (%) (length 14 mm) | Transmission loss computed (%/mm) | Inside optical surface (bubble observation) | Average sintered grain size (μm) | Remarks: HIP temperature profile |
|---|---|---|---|---|---|---|---|
| | Temperature stages | Ramp rate (° C./h) | | | | | |
| Comparative Example 1 | overall range | 400 | 90-95 | 0.36-0.71 | many streaks of coalesced bubbles | 9 | P99 |
| Example 1-1 | overall range | 60 | 96-98 | 0.14-0.29 | sparse bubbles | 5 | P11 |
| Example 1-2 | RT*[2] to T/2 T/2 to T | 400 60 | 96-98 | 0.14-0.29 | sparse bubbles | — | — |
| Example 1-3 | RT to 9T/10 9T/10 to T | 400 60 | 96-98 | 0.14-0.29 | sparse bubbles | — | — |
| Example 1-4 | RT to 13T/14 13T/14 to T | 400 60 | 96-98 | 0.14-0.29 | sparse bubbles | — | P12 |
| Example 1-5 | overall range | 30 | 98-99 | 0.07-0.14 | substantially no bubbles | 3 | P21 |
| Example 1-6 | RT to 13T/14 13T/14 to T | 400 30 | 98-99 | 0.07-0.14 | substantially no bubbles | — | P22 |
| Example 1-7 | overall range | 150 | 95-98 | 0.14-0.36 | sparse bubbles | 5 | — |
| Example 1-8 | RT to 13T/14 13T/14 to T | 400 150 | 95-98 | 0.14-0.36 | sparse bubbles | — | — |
| Example 1-9 | RT to 13T/14 13T/14 to T | 400 180 | 92-97 | 0.21-0.57 | many clumps of coalesced bubbles | 8 | — |

*[1]transmittance at wavelength 1064 nm
*[2]RT = room temperature (25° C.)

Next, the compact as burned-out was placed in a vacuum heating furnace where it was heated at a ramp rate of 100° C./h to a temperature of 1,500-1,700° C., held at the temperature for 3 hours, and cooled at a drop rate of 600° C./h, yielding a sintered body. In the step, the sintering temperature and holding time were adjusted such that the sintered sample might have a relative density of 96%.

The sintered body was then subjected to HIP heat treatment at a temperature T of 1,500-1,800° C. and a pressure of 190 MPa using Ar gas as pressurizing medium, for a holding time of 3 hours. In this Example, heat treatment was carried out while the temperature ramp rate was set at nine levels as shown in Table 1 and the drop rate was fixed at 400° C./h. A comparative sample was prepared under conditions according to the temperature profile P99 in FIGURE.

The HIP treated samples were ground and polished to a length of 14 mm. The opposite optical end surfaces of each sample were subjected to final optical polishing to an optical surface accuracy of λ/8 wherein measurement wavelength λ=633 nm. The sample was further coated with an antireflective coating designed to a central wavelength of 1,064 nm before a transmittance at wavelength 1,064 nm was measured, from which a visible region transmission loss per sintered body unit length was computed. The bubble state inside each optical surface was observed under an electron microscope (SEM).

Example 2

An example using $Lu_2O_3$ powder as the raw material powder is described.

A burnout CIP compact was prepared as in Example 1 aside from using $Lu_2O_3$ powder with a purity of at least 99.9 wt %, available from Shin-Etsu Chemical Co., Ltd.

Next, the burnout compact was placed in a vacuum heating furnace where it was heated at a ramp rate of 100° C./h to a temperature of 1,600-1,800° C., held at the temperature for 3 hours, and cooled at a drop rate of 600° C./h, yielding a sintered body. In the step, the sintering temperature and holding time were adjusted such that the sintered sample might have a relative density of 96%.

The sintered body was then subjected to HIP heat treatment at a temperature T of 1,600-1,850° C. and a pressure of 190 MPa using Ar gas as pressurizing medium, for a holding time of 3 hours. In this Example, heat treatment was carried out while the temperature ramp rate was set at nine levels as shown in Table 2 and the drop rate was fixed at 400° C./h. A comparative sample was prepared under conditions according to the temperature profile P99 in FIGURE.

The HIP treated samples thus obtained were ground and polished to a length of 14 mm. The opposite optical end surfaces of each sample were subjected to final optical polishing to an optical surface accuracy of λ/8 wherein measurement wavelength λ=633 nm. The sample was further coated with an antireflective coating designed to a central wavelength of 1,064 nm before a transmittance at wavelength 1,064 nm was measured, from which a visible region transmission loss per sintered body unit length was computed. The bubble state inside each optical surface was observed under an electron microscope (SEM).

Further, the samples of Examples 2-1, 2-5, 2-7 and 2-9 and Comparative Example 2 on their optical surface were subjected to mirror etching treatment with hydrochloric acid at constant temperature until sintered grain boundary was definitely seen. The sample was observed under SEM and sintered grain size was measured. An average of 400 grains is reported as average sintered grain size.

The results are shown in Table 2.

The sintered body was then subjected to HIP heat treatment at a temperature T of 1,600-1,850° C. and a pressure of 190 MPa using Ar gas as pressurizing medium, for a holding time of 3 hours. In this Example, heat treatment was carried out while the temperature ramp rate was set at nine levels as shown in Table 3 and the drop rate was fixed at 400° C./h. A comparative sample was prepared under conditions according to the temperature profile P99 in FIGURE.

The HIP treated samples thus obtained were ground and polished to a length of 14 mm. The opposite optical end surfaces of each sample were subjected to final optical polishing to an optical surface accuracy of λ/8 wherein measurement wavelength λ=633 nm. The sample was further coated with an antireflective coating designed to a central wavelength of 1,064 nm before a transmittance at wavelength 1,064 nm was measured, from which a visible

TABLE 2

Sintered body type: $Lu_2O_3$
HIP heat treatment temperature T = 1,600-1,850° C.

| | HIP heating pattern | | Transmittance*[1] (%) (length 14 mm) | Transmission loss computed (%/mm) | Inside optical surface (bubble observation) | Average sintered grain size (μm) | Remarks: HIP temperature profile |
|---|---|---|---|---|---|---|---|
| | Temperature stages | Ramp rate (° C./h) | | | | | |
| Comparative Example 2 | overall range | 400 | 90-95 | 0.36-0.71 | many streaks of coalesced bubbles | 8 | P99 |
| Example 2-1 | overall range | 60 | 96-98 | 0.14-0.29 | sparse bubbles | 4 | P11 |
| Example 2-2 | RT*[2] to T/2<br>T/2 to T | 400<br>60 | 96-98 | 0.14-0.29 | sparse bubbles | — | — |
| Example 2-3 | RT to 9T/10<br>9T/10 to T | 400<br>60 | 96-98 | 0.14-0.29 | sparse bubbles | — | — |
| Example 2-4 | RT to 13T/14<br>13T/14 to T | 400<br>60 | 96-98 | 0.14-0.29 | sparse bubbles | — | P12 |
| Example 2-5 | overall range | 30 | 98-99 | 0.07-0.14 | substantially no bubbles | 2-3 | P21 |
| Example 2-6 | RT to 13T/14<br>13T/14 to T | 400<br>30 | 98-99 | 0.07-0.14 | substantially no bubbles | — | P22 |
| Example 2-7 | overall range | 150 | 95-98 | 0.14-0.36 | sparse bubbles | 4 | — |
| Example 2-8 | RT to 13T/14<br>13T/14 to T | 400<br>150 | 95-98 | 0.14-0.36 | sparse bubbles | — | — |
| Example 2-9 | RT to 13T/14<br>13T/14 to T | 400<br>180 | 92-96 | 0.29-0.57 | many clumps of coalesced bubbles | 7 | — |

*[1]transmittance at wavelength 1064 nm
*[2]RT = room temperature (25° C.)

Example 3

An example using $Sc_2O_3$ powder as the raw material powder is described.

A burnout CIP compact was prepared as in Example 1 aside from using $Sc_2O_3$ powder with a purity of at least 99.9 wt %, available from Shin-Etsu Chemical Co., Ltd.

Next, the burnout compact was placed in a vacuum heating furnace where it was heated at a ramp rate of 100° C./h to a temperature of 1,600-1,800° C., held at the temperature for 3 hours, and cooled at a drop rate of 600° C./h, yielding a sintered body. In the step, the sintering temperature and holding time were adjusted such that the sintered sample might have a relative density of 96%.

region transmission loss per sintered body unit length was computed. The bubble state inside each optical surface was observed under an electron microscope (SEM).

Further, the samples of Examples 3-1, 3-5, 3-7 and 3-9 and Comparative Example 3 on their optical surface were subjected to mirror etching treatment with hydrochloric acid at constant temperature until sintered grain boundary was definitely seen. The sample was observed under SEM and sintered grain size was measured. An average of 400 grains is reported as average sintered grain size.

The results are shown in Table 3.

TABLE 3

Sintered body type: Sc$_2$O$_3$
HIP heat treatment temperature T = 1,600-1,850° C.

| | HIP heating pattern | | Transmittance*[1] (%) (length 14 mm) | Transmission loss computed (%/mm) | Inside optical surface (bubble observation) | Average sintered grain size (μm) | Remarks: HIP temperature profile |
|---|---|---|---|---|---|---|---|
| | Temperature stages | Ramp rate (° C./h) | | | | | |
| Comparative Example 3 | overall range | 400 | 90-95 | 0.36-0.71 | many streaks of coalesced bubbles | 8 | P99 |
| Example 3-1 | overall range | 60 | 96-98 | 0.14-0.29 | sparse bubbles | 4 | P11 |
| Example 3-2 | RT*[2] to T/2<br>T/2 to T | 400<br>60 | 96-98 | 0.14-0.29 | sparse bubbles | — | — |
| Example 3-3 | RT to 9T/10<br>9T/10 to T | 400<br>60 | 96-98 | 0.14-0.29 | sparse bubbles | — | — |
| Example 3-4 | RT to 13T/14<br>13T/14 to T | 400<br>60 | 96-98 | 0.14-0.29 | sparse bubbles | — | P12 |
| Example 3-5 | overall range | 30 | 98-99 | 0.07-0.14 | substantially no bubbles | 2-3 | P21 |
| Example 3-6 | RT to 13T/14<br>13T/14 to T | 400<br>30 | 98-99 | 0.07-0.14 | substantially no bubbles | — | P22 |
| Example 3-7 | overall range | 150 | 95-97 | 0.21-0.36 | sparse bubbles | 5 | — |
| Example 3-8 | RT to 13T/14<br>13T/14 to T | 400<br>150 | 95-97 | 0.21-0.36 | sparse bubbles | — | — |
| Example 3-9 | RT to 13T/14<br>13T/14 to T | 400<br>180 | 92-96 | 0.29-0.57 | many clumps of coalesced bubbles | 7 | — |

*[1]transmittance at wavelength 1064 nm
*[2]RT = room temperature (25° C.)

As seen from the results of Tables 1 to 3, independent of the type of starting material, that is, for all of Y$_2$O$_3$ powder, Lu$_2$O$_3$ powder and Sc$_2$O$_3$ powder, when the ramp rate of the final stage (14) in the temperature range S is set at 60° C./h, as in Examples 1-1 to 1-4, 2-1 to 2-4, and 3-1 to 3-4, the transmission loss per unit length is reduced (or improved) to about 2/5 as compared with Comparative Examples 1 to 3 corresponding to the conventional ramp rate (400° C./h, i.e., ramp rate is not slowed down). Also, when the ramp rate of the final stage (14) in the temperature range S is reduced to 30° C./h, as in Examples 1-5, 1-6, 2-5, 2-6, 3-5 and 3-6, the transmission loss per unit length is significantly reduced (or improved) to about 1/5 as compared with Comparative Examples 1 to 3 corresponding to the conventional ramp rate (400° C./h, i.e., ramp rate is not slowed down). It is further demonstrated that when the ramp rate of the final stage (14) in the temperature range S is reduced to 150° C./h, as in Examples 1-7, 1-8, 2-7, 2-8, 3-7 and 3-8, the transmission loss per unit length is reduced (or improved) to about 1/2 as compared with Comparative Examples 1 to 3 corresponding to the conventional ramp rate (400° C./h, i.e., ramp rate is not slowed down).

For those metal oxide sintered bodies in which the transmission loss per unit length is improved as in Examples 1-1 to 1-8, 2-1 to 2-8, and 3-1 to 3-8, the amount of residual bubbles inside the optical surface is dramatically reduced.

It is seen from the above results that when the ramp rate of the final stage in the temperature range S of HIP treatment step is reduced to 150° C./h or lower, there are obtained light-transmissive oxide sintered bodies featuring a significantly reduced amount of residual bubbles in the metal oxide sintered body, an extremely low transmission loss, and true clarity, as compared with the HIP treatment at the conventional ramp rate. The results of Examples 1-9, 2-9 and 3-9 demonstrate that the upper limit of ramp rate below which an effect of improving transmission loss per unit length begins to appear is 180° C./h.

It is also seen that grain growth is promoted during the HIP treatment step at the conventional ramp rate of 400° C./h, whereas grain growth is suppressed during the HIP treatment step where the ramp rate of the final stage in the temperature range S is reduced to 150° C./h or lower. The results of Examples 1-9, 2-9 and 3-9 demonstrate that the upper limit of ramp rate below which an effect of suppressing grain growth begins to appear is 180° C./h.

It is seen from the above results that when the ramp rate of the heating step during the HIP treatment is selected to a sufficient condition to suppress the growth of sintered grains, there is obtained a truly clear light-transmissive oxide sintered body in which the amount of bubbles remaining in the metal oxide sintered body is significantly reduced by a certain cause-and-effect relationship and the transmission loss is minimized. It is evident that the sufficient condition to suppress the growth of sintered grains is attainable when the ramp rate of at least the final stage in the temperature range S is reduced to a rate of 180° C./h or lower, which is remarkably lower than the conventional ramp rate.

Example 4

Next, a terbium base sesquioxide Faraday cell obtained by sintering a mixture of Tb$_4$O$_7$ powder and Y$_2$O$_3$ powder is described as an exemplary metal oxide sintered body having an optical function.

There were furnished Tb$_4$O$_7$ powder and Y$_2$O$_3$ powder, both with a purity of at least 99.9 wt % and available from Shin-Etsu Chemical Co., Ltd. These raw material powders were mixed in a volume ratio 1:1, to which was added 0.5 wt % of ZrO$_2$ powder, available from Daiichi Kigenso Kagaku Kogyo Co., Ltd. Further an organic dispersant and organic binder were added to the powders, which were dispersed and mixed in ethanol in a zirconia ball mill. The milling time was 24 hours. Subsequent spray drying yielded a granular raw material (starting material) having an average particle size of 20 μm.

Next, a mold having a diameter of 10 mm was filled with the starting material. Using a uniaxial press molding machine, the material was preliminary molded into a rod of 20 mm long, which was hydrostatically pressed under a pressure of 198 MPa into a CIP compact. The CIP compact was placed in a muffle furnace where it was heat treated in air at 800° C. for 3 hours for binder burnout.

sintered body unit length was computed. The bubble state inside each optical surface was observed under an electron microscope (SEM).

Further, the samples of Examples 4-1, 4-5, 4-7 and 4-9 and Comparative Example 4 on their optical surface were subjected to mirror etching treatment with hydrochloric acid at constant temperature until sintered grain boundary was definitely seen. The sample was observed under SEM and sintered grain size was measured. An average of 400 grains is reported as average sintered grain size.

The results are shown in Table 4.

TABLE 4

Sintered body type: $Tb_1Y_1O_3$
HIP heat treatment temperature T = 1,500-1,800° C.

| | HIP heating pattern | | Transmittance*[1] (%) (length 10 mm) | Transmission loss computed (%/mm) | Inside optical surface (bubble observation) | Average sintered grain size (μm) | Remarks: HIP temperature profile |
|---|---|---|---|---|---|---|---|
| | Temperature stages | Ramp rate (° C./h) | | | | | |
| Comparative Example 4 | overall range | 400 | 91-96 | 0.4-0.9 | many streaks of coalesced bubbles | 9 | P99 |
| Example 4-1 | overall range | 60 | 96-98 | 0.2-0.4 | sparse bubbles | 5 | P11 |
| Example 4-2 | RT*[2] to T/2<br>T/2 to T | 400<br>60 | 96-98 | 0.2-0.4 | sparse bubbles | — | — |
| Example 4-3 | RT to 9T/10<br>9T/10 to T | 400<br>60 | 96-98 | 0.2-0.4 | sparse bubbles | — | — |
| Example 4-4 | RT to 13T/14<br>13T/14 to T | 400<br>60 | 96-98 | 0.2-0.4 | sparse bubbles | — | P12 |
| Example 4-5 | overall range | 30 | 98.5-99.5 | 0.05-0.15 | substantially no bubbles | 3 | P21 |
| Example 4-6 | RT to 13T/14<br>13T/14 to T | 400<br>30 | 98.5-99.5 | 0.05-0.15 | substantially no bubbles | — | P22 |
| Example 4-7 | overall range | 150 | 95-98 | 0.14-0.36 | sparse bubbles | 4 | — |
| Example 4-8 | RT to 13T/14<br>13T/14 to T | 400<br>150 | 95-98 | 0.14-0.36 | sparse bubbles | — | — |
| Example 4-9 | RT to 13T/14<br>13T/14 to T | 400<br>180 | 92-96 | 0.29-0.57 | many clumps of coalesced bubbles | 8 | — |

*[1]transmittance at wavelength 1064 nm
*[2]RT = room temperature (25° C.)

Next, the compact as burned-out was placed in a vacuum heating furnace where it was heated at a ramp rate of 100° C./h to a temperature of 1,500-1,700° C., held at the temperature for 3 hours, and cooled at a drop rate of 600° C./h, yielding a sintered body. In the step, the sintering temperature and holding time were adjusted such that the sintered sample might have a relative density of 96%.

The sintered body was then subjected to HIP heat treatment at a temperature T of 1,500-1,800° C. and a pressure of 190 MPa using Ar gas as pressurizing medium, for a holding time of 3 hours. In this Example, heat treatment was carried out while the temperature ramp rate was set at nine levels as shown in Table 4 and the drop rate was fixed at 400° C./h. A comparative sample was prepared under conditions according to the temperature profile P99 in FIGURE.

The HIP treated samples were ground and polished to a length of 10 mm. The opposite optical end surfaces of each sample were subjected to final optical polishing to an optical surface accuracy of λ/8 wherein measurement wavelength λ=633 nm. The sample was further coated with an antireflective coating designed to a central wavelength of 1,064 nm before a transmittance at wavelength 1,064 nm was measured, from which a visible region transmission loss per As described above, like Examples 1 to 3, when the ramp rate of at least the final stage (14) in the temperature range S is set at 60° C./h as in Examples 4-1 to 4-4, the transmission loss per unit length is reduced (or improved) to about 10/22 as compared with Comparative Example 4 corresponding to the conventional ramp rate (400° C./h, i.e., ramp rate is not slowed down). Also, when the ramp rate of the final stage (14) in the temperature range S is reduced to 30° C./h as in Examples 4-5 and 4-6, the transmission loss per unit length is significantly reduced (or improved) to about ⅙ as compared with Comparative Example 4 corresponding to the conventional ramp rate (400° C./h, i.e., ramp rate is not slowed down). It is further demonstrated that when the ramp rate of the final stage (14) in the temperature range S is reduced to 150° C./h as in Examples 4-7 and 4-8, the transmission loss per unit length is reduced (or improved) to about ½ as compared with Comparative Example 4 corresponding to the conventional ramp rate (400° C./h, i.e., ramp rate is not slowed down). For those metal oxide sintered bodies in which the transmission loss per unit length is improved as in Examples 4-1 to 4-8, the amount of residual bubbles inside the optical surface is dramatically reduced. The results of Example 4-9 demonstrate that the upper limit of ramp rate below which an effect of improving transmission loss per unit length begins to appear is 180° C./h.

It is also seen that like Examples 1 to 3, grain growth is promoted during the HIP treatment step at the conventional ramp rate of 400° C./h, whereas grain growth is suppressed during the HIP treatment step where the ramp rate of the final stage in the temperature range S is reduced to 150° C./h or lower. The results of Example 4-9 demonstrate that the upper limit of ramp rate below which an effect of suppressing grain growth begins to appear is 180° C./h.

It is seen from the above results that in the case of a terbium base sesquioxide Faraday cell as well, when the ramp rate of the heating step during the HIP treatment is selected to a sufficient condition to suppress the growth of sintered grains, there is obtained a truly clear terbium base sesquioxide Faraday sintered body in which the amount of bubbles remaining in the metal oxide sintered body is significantly reduced by a certain cause-and-effect relationship and the transmission loss is minimized. It is evident that the sufficient condition to suppress the growth of sintered grains is attainable when the ramp rate of at least the final stage in the temperature range S is reduced to a rate of 180° C./h or lower, which is remarkably lower than the conventional ramp rate.

Finally, each of the sintered bodies of Examples 4-1 to 4-9 thus obtained was constructed as a terbium base sesquioxide Faraday cell, the periphery of which was covered with a SmCo magnet of a sufficient size to saturate magnetization. This optical function unit was set on an optical axis between a polarizer and an analyzer. Next, light of wavelength 1,064 nm was directed from both forward and backward directions to confirm a Faraday rotation effect. As a result, all the cells showed a transmission loss of less than 0.1 dB in the forward direction and an extinction ratio of at least 40 dB in the backward direction.

It is demonstrated that when the manufacture method of the invention is applied to a metal oxide sintered body having optical function, a truly clear oxide sintered body having a minimized transmission loss is obtained.

Although the invention has been described with reference to the embodiments, the invention is not limited thereto, and other embodiments may occur to, or various additions, changes and deletions may be made by those skilled in the art. All such embodiments fall in the scope of the invention as long as the advantages and results of the invention are obtainable.

REFERENCE SIGNS LIST

P11, P12, P21, P22, P99 temperature profile
S temperature range

The invention claimed is:

1. A method for manufacturing a light-transmissive metal oxide sintered body comprising:
subjecting a sintered body composed mainly of metal oxide to hot isostatic pressing (HIP) treatment at a HIP heat treatment temperature T set in a range of 1,000 to 2,000° C. to form a light-transmissive sintered body, wherein the HIP treatment includes heating at a ramp rate over a temperature range from room temperature to the HIP heat treatment temperature T, the temperature range is divided into a plurality of stages, the ramp rate is controlled in each divided stage, and the ramp rate of at least a final stage inclusive of the HIP heat treatment temperature T is 10° C./h to 60° C./h.

2. The method of claim 1 wherein the temperature range of the heating step is equally divided into 2 to 20 stages.

3. The method of claim 1 wherein in the heating step of the HIP treatment, the final stage is conducted at a ramp rate of 10° C./h to 60° C./h and the remaining stages are conducted at a ramp rate of 200° C./h to 800° C./h.

4. The method of claim 1 wherein in the heating step of the HIP treatment, all stages are conducted at a ramp rate of 10° C./h to 60° C./h.

5. The method of claim 1 wherein the sintered body is prepared using a particulate oxide of at least one metal element selected from the group consisting of Mg, Y, Sc, lanthanides, Ti, Zr, Al, Ga, Si, Ge, Pb, and Bi.

6. The method of claim 5, comprising press molding the metal oxide particles into a body of predetermined shape, sintering the body, and subjecting the sintered body to the HIP treatment.

7. The method of claim 1 wherein the sintered body is a sesquioxide sintered body which is prepared using a powder consisting of particulate oxides of at least one rare earth element selected from the group consisting of Y, Sc, Lu, Tb, Yb, Gd, Nd, Eu, Ho, Dy, Tm, Sm, Pr, Ce, and Er and particulate Zr oxide, wherein the amount of the particulate Zr oxide added is up to 1% by weight, exclusive of 0% by weight.

8. The method of claim 1 wherein the sintered body is prepared using a particulate oxide of yttria-stabilized zirconia, $Al_2O_3$-26 wt % MgO, lead lanthanum zirconate titanate, alumina, $Y_3Al_5O_{12}$, $Lu_3Al_5O_{12}$, $Tb_3Ga_5O_{12}$, $Bi_4Ge_3O_{12}$ or $Gd_2SiO_5$.

* * * * *